United States Patent [19]

Noguchi

[11] Patent Number: 5,184,261
[45] Date of Patent: Feb. 2, 1993

[54] VARIOUS-SIZED-CASSETTE HOUSING SHELF

[75] Inventor: Hideaki Noguchi, Kanagawa, Japan

[73] Assignee: Sony Corporation, Tokyo, Japan

[21] Appl. No.: 674,980

[22] Filed: Mar. 26, 1991

[30] Foreign Application Priority Data

Mar. 28, 1990 [JP] Japan .................................. 2-079974
Mar. 28, 1990 [JP] Japan .................................. 2-079975
Mar. 28, 1990 [JP] Japan .................................. 2-079977

[51] Int. Cl.⁵ .......................................... G11B 15/68
[52] U.S. Cl. ..................................... 360/94; 360/96.5
[58] Field of Search .......................... 360/94, 96.5, 92

[56] References Cited

U.S. PATENT DOCUMENTS 4,008,490  2/1977  Lemelson ............................. 360/94
4,791,510  12/1988  Rademacher ....................... 360/94
4,937,690  6/1990  Yamashita et al. ................. 360/94

Primary Examiner—David J. Severin
Attorney, Agent, or Firm—Alvin Sinderbrand; William S. Frommer

[57] ABSTRACT

In a cassette housing shelf for accommodating various sized cassettes in cassette auto-changers or the like, a guiding block for guiding a small-sized cassette is provided near to a cassette inlet of a cassette housing portion formed upon the shelf. When a large-sized cassette is inserted into the cassette housing portion, the guiding block is automatically removed from the cassette housing portion, and when a small-sized cassette is inserted, the guiding block securely leads the cassette to a predetermined space within the cassette housing portion, so that it is easy to insert the small-sized cassette into the cassette housing portion.

4 Claims, 17 Drawing Sheets

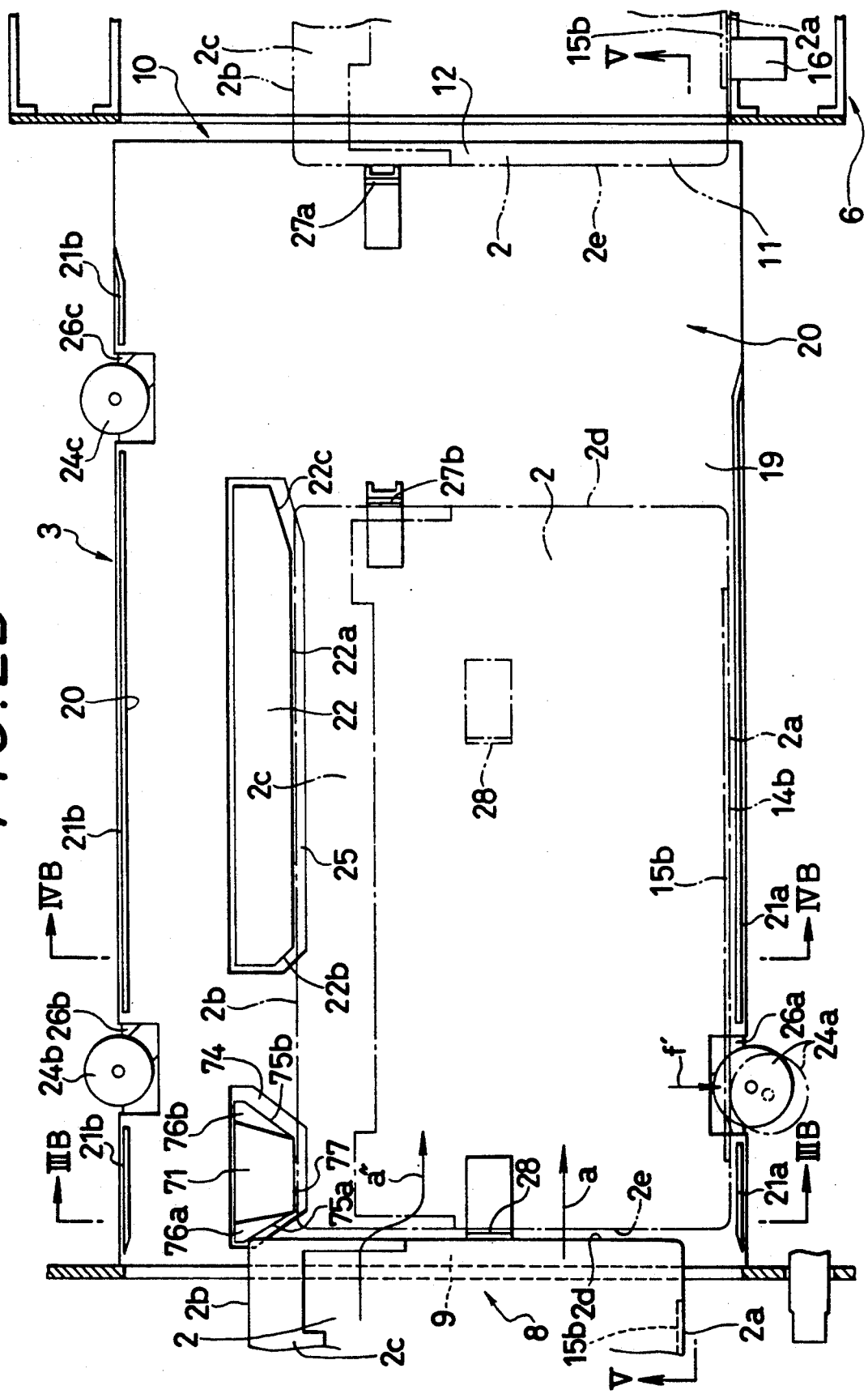

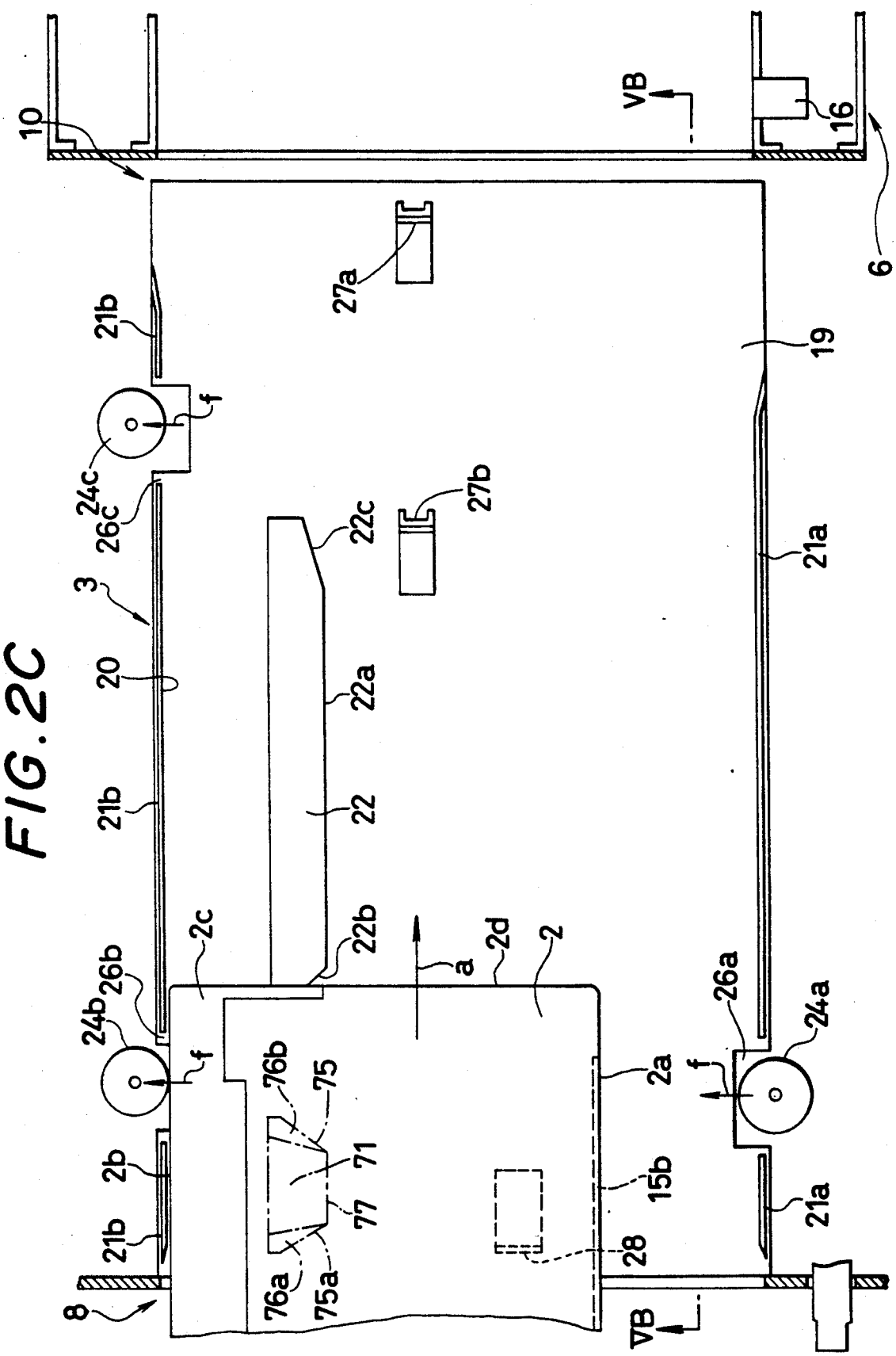

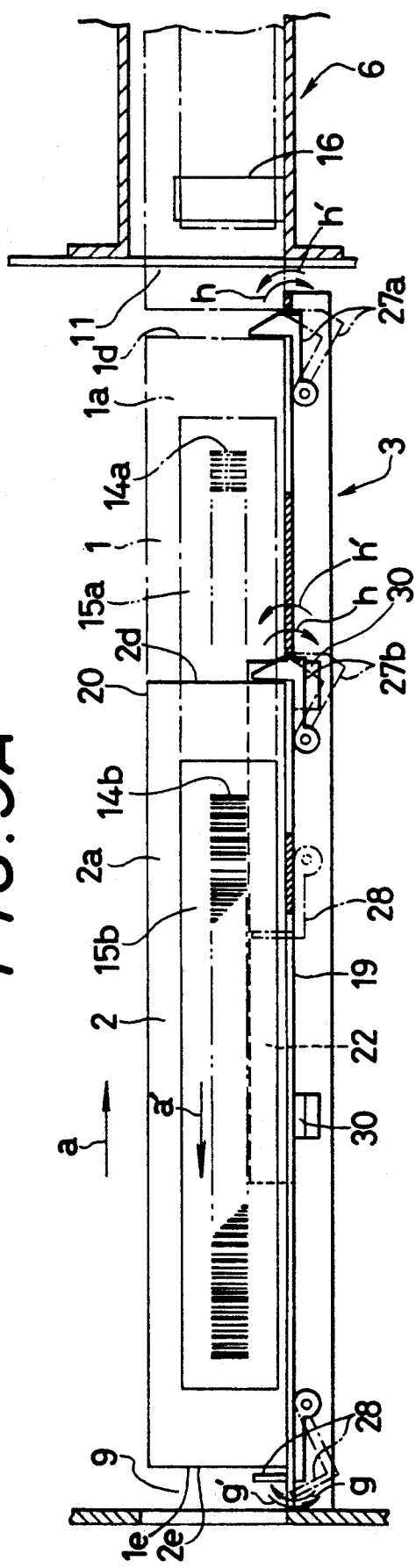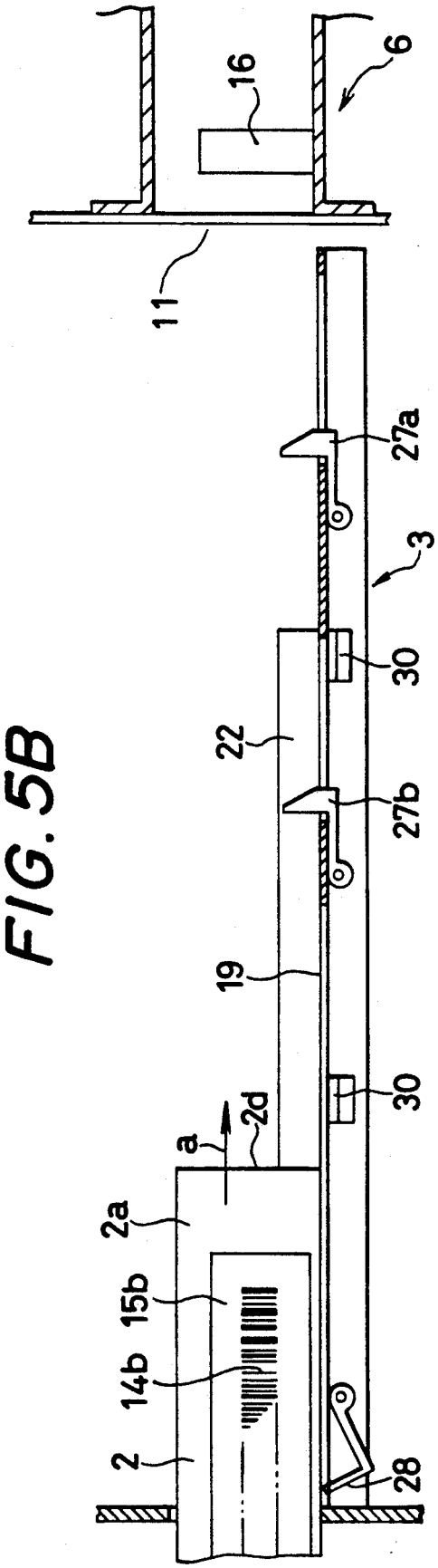
FIG.5A
FIG.5B

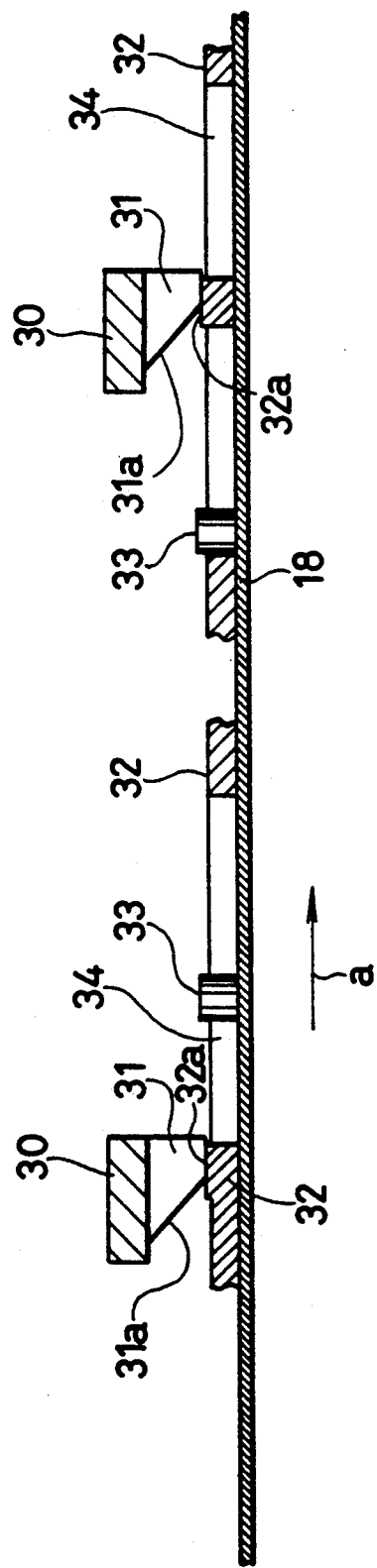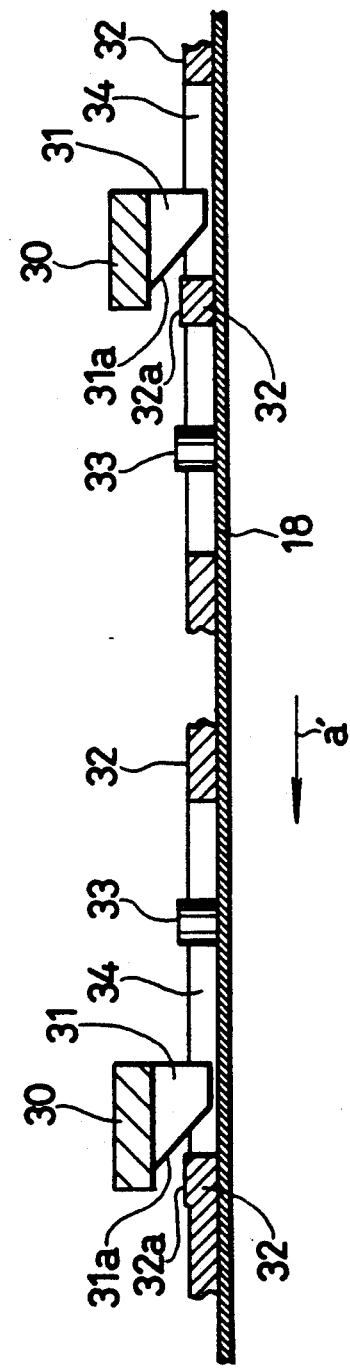

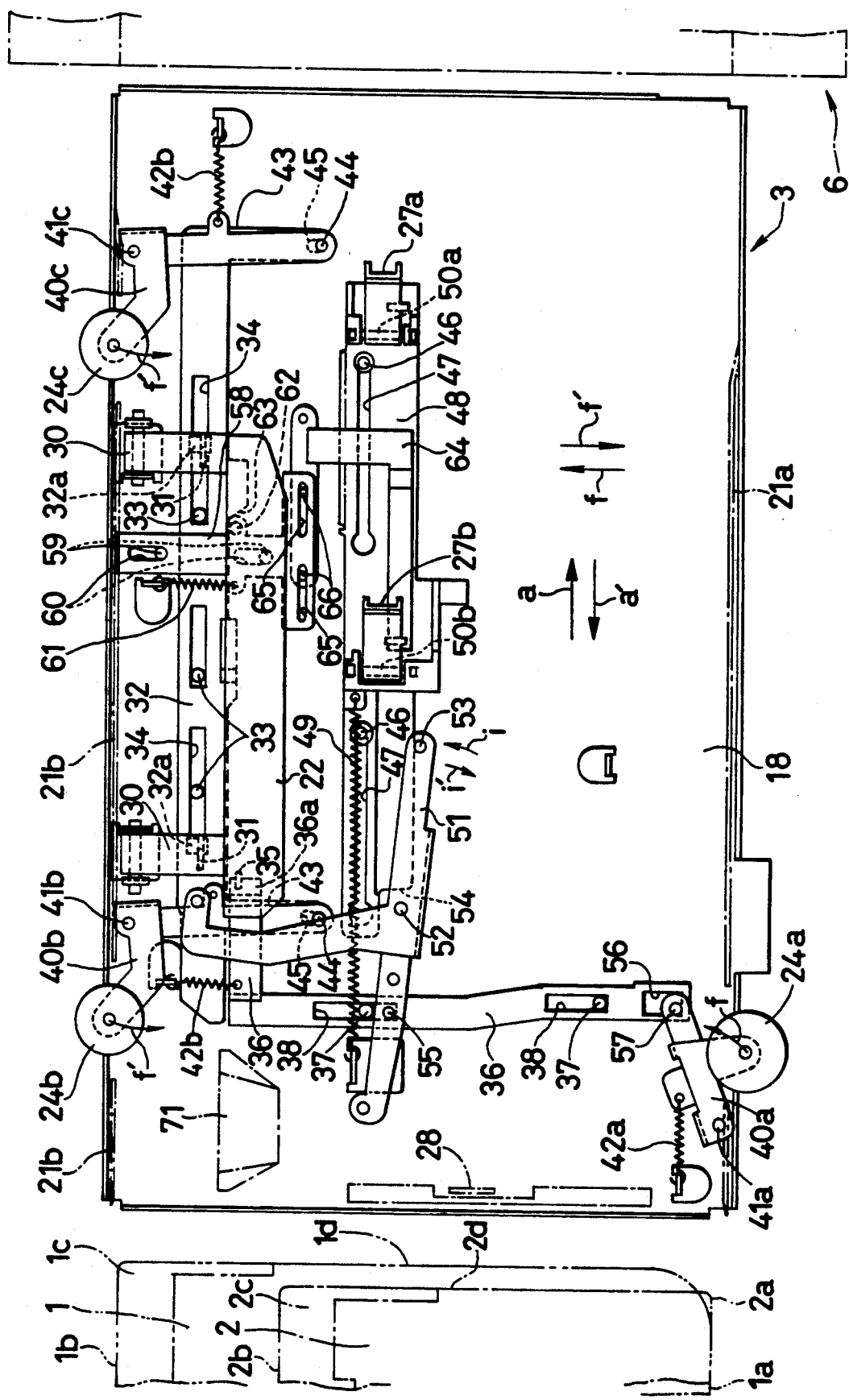

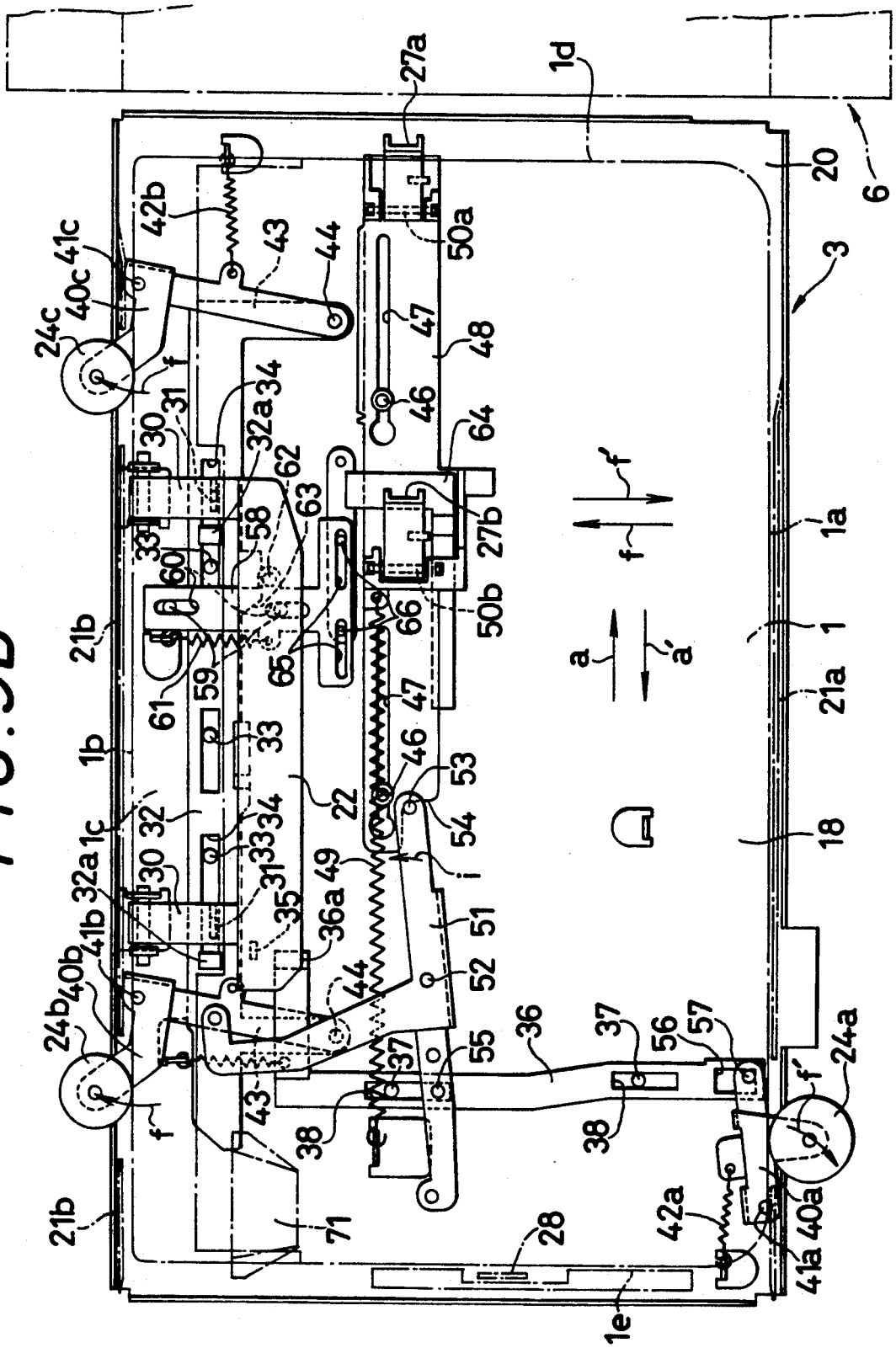

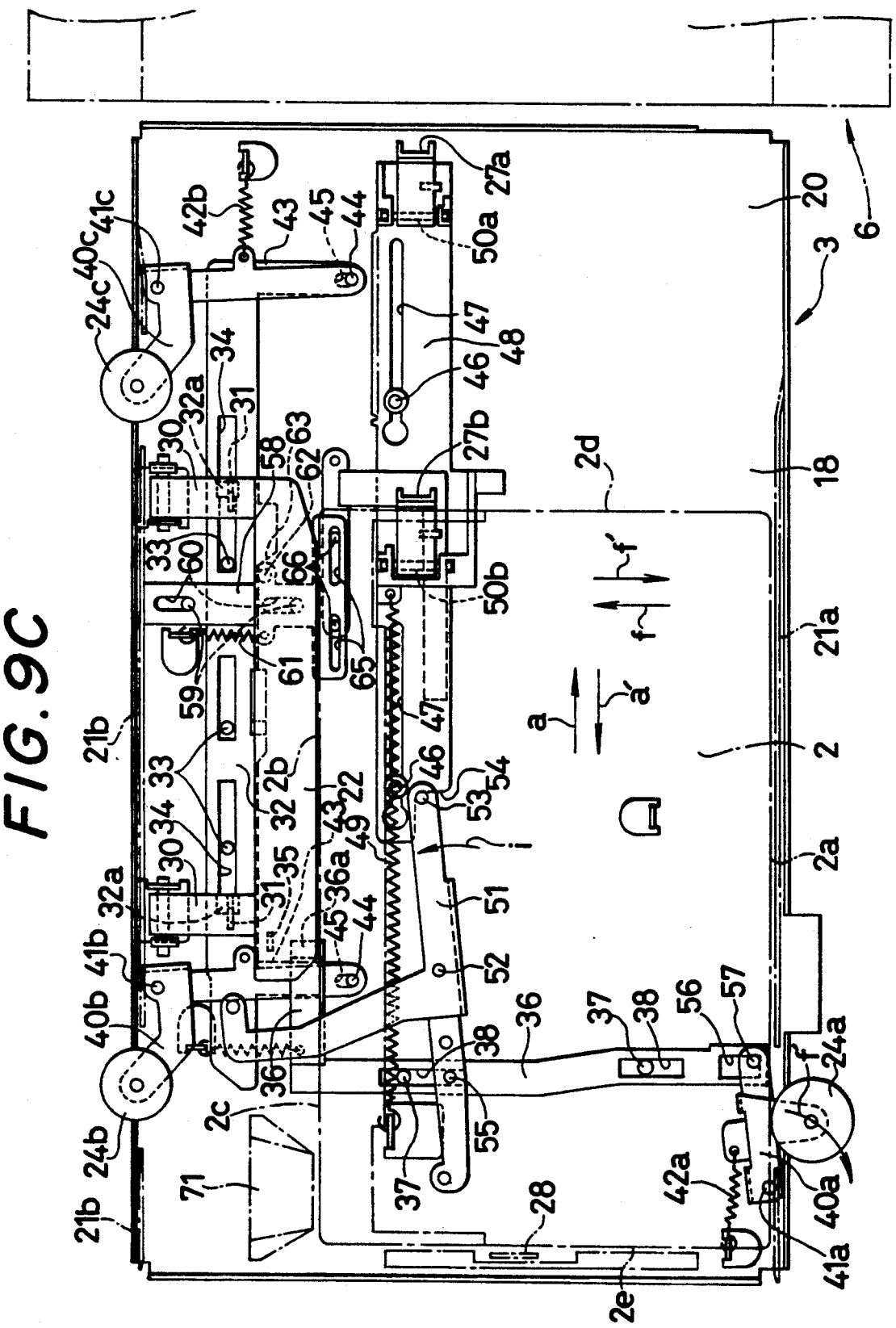

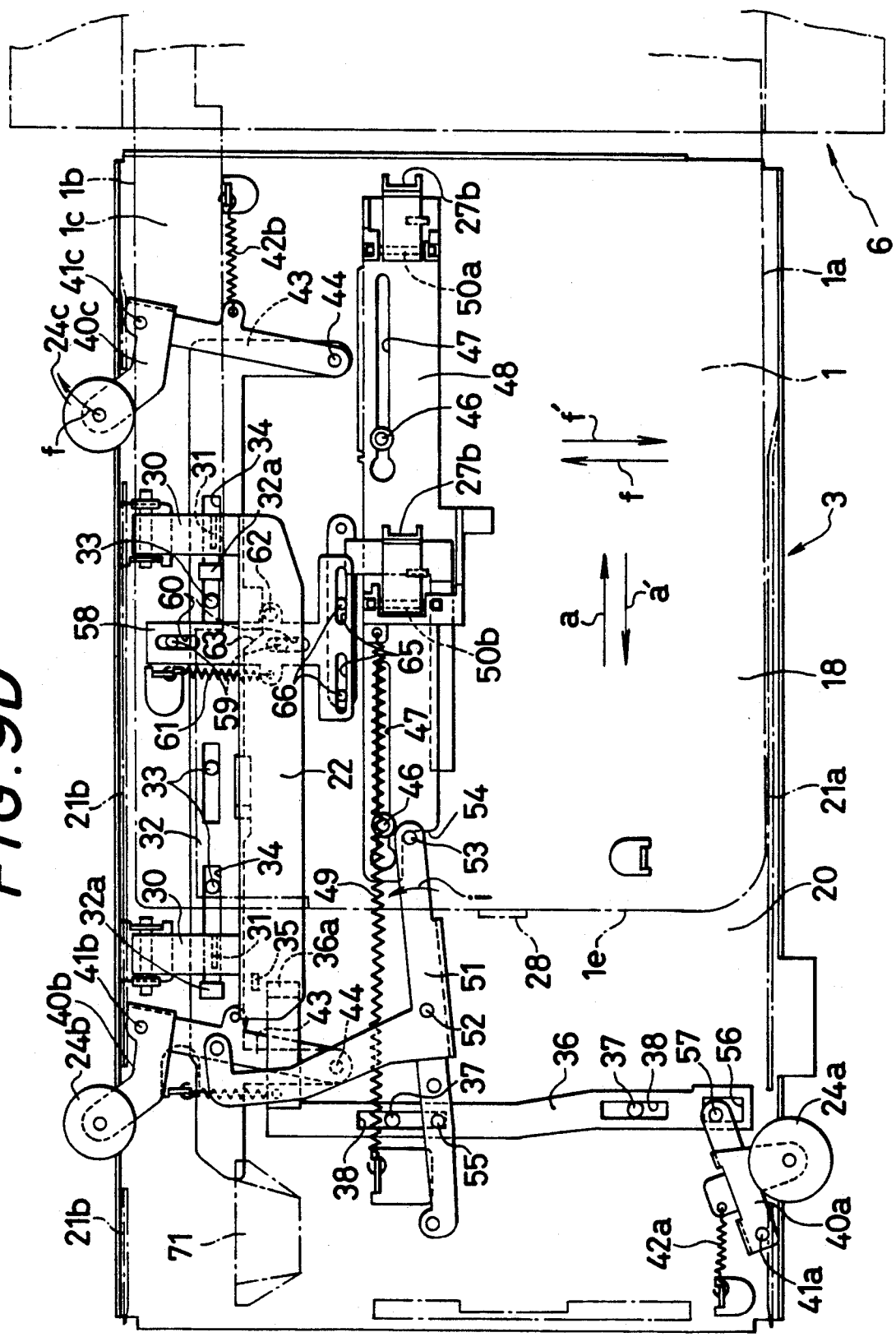

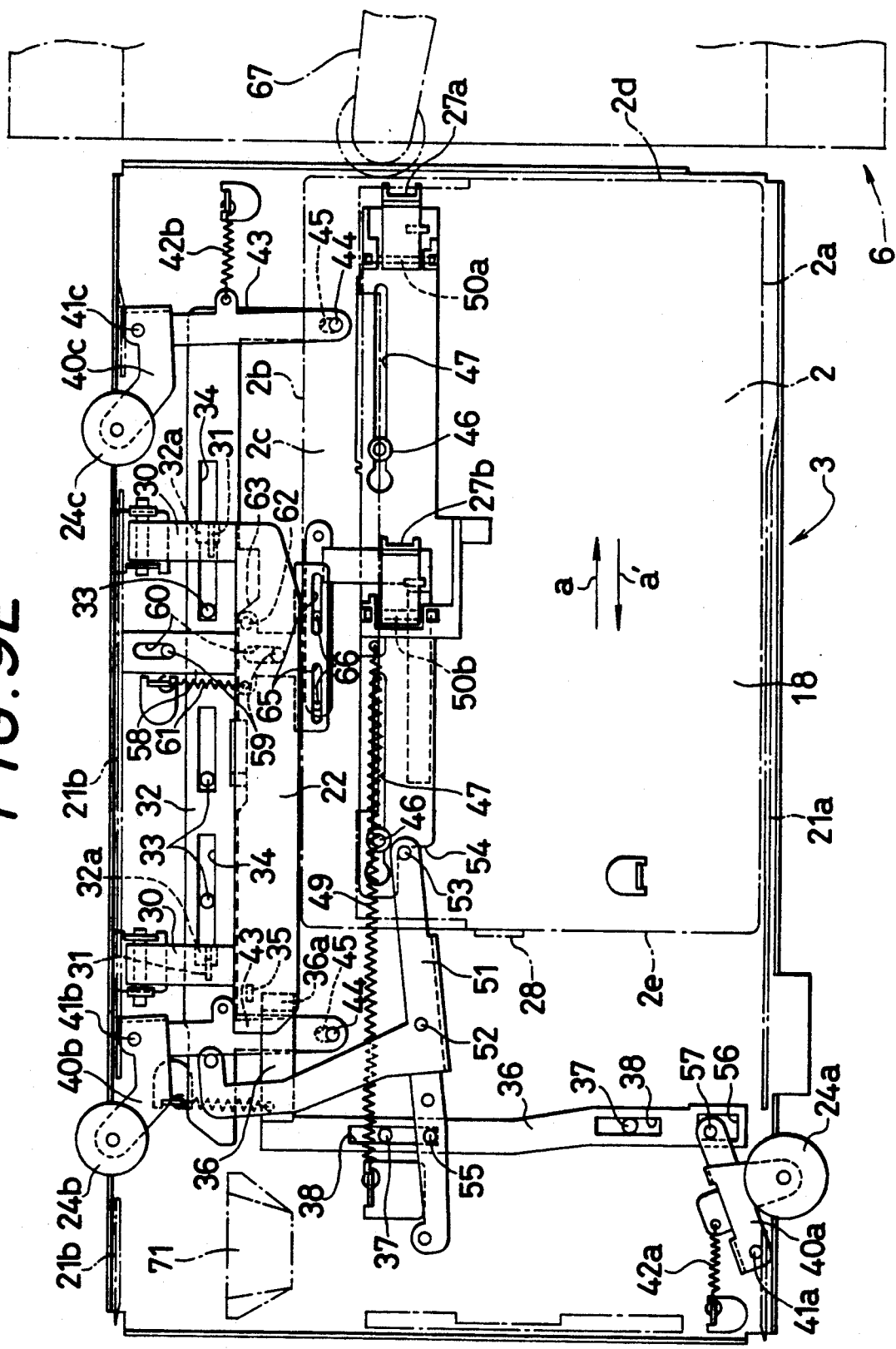

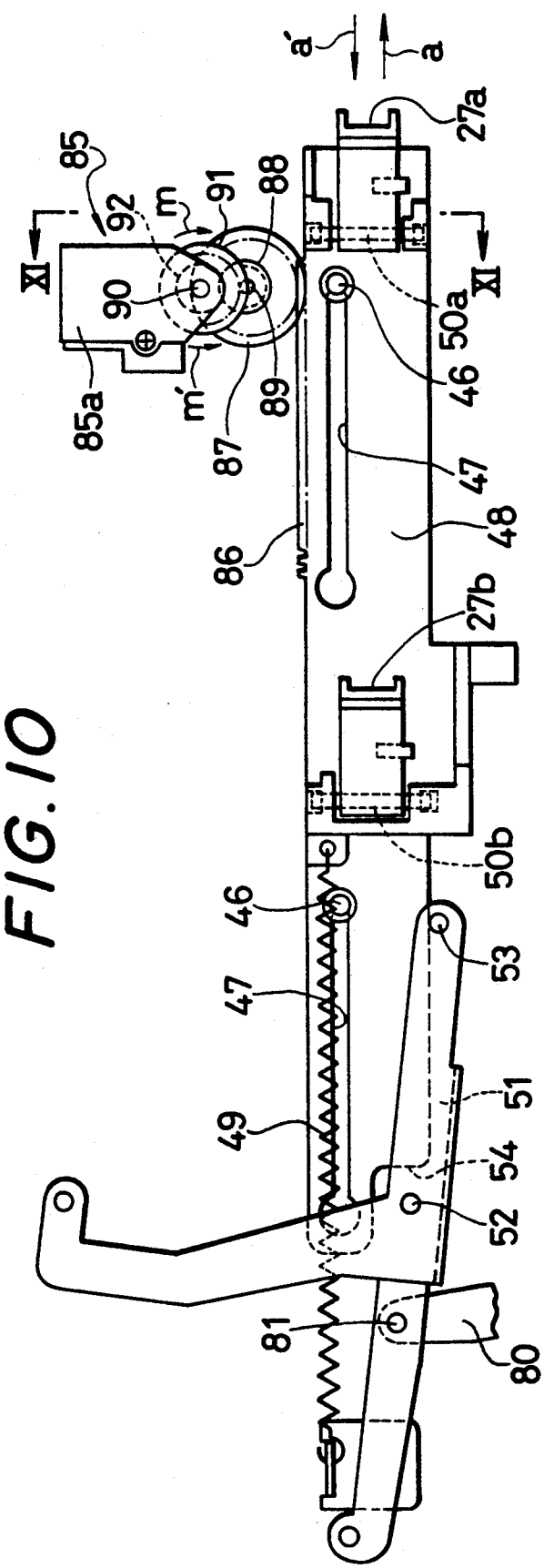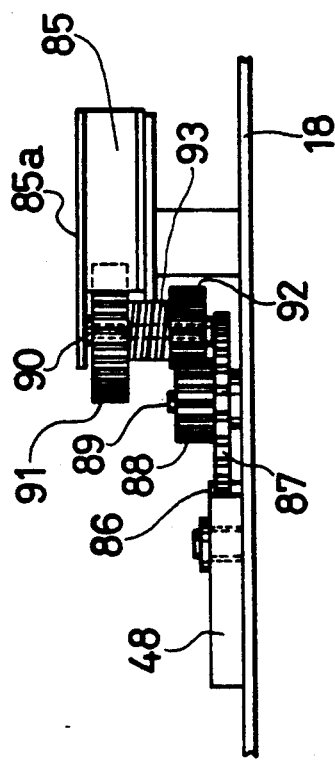
FIG. 10
FIG. 11

VARIOUS-SIZED-CASSETTE HOUSING SHELF

BACKGROUND OF THE INVENTION

1. Field of the Invention

This invention relates to a cassette housing shelf that is adapted for accommodating various sized cassettes in cassette auto-changers used for continuous, long-time video recording or reproducing, for example, in a television broadcasting station.

2. Description of the Related Art

The applicant of this invention disclosed a various-sized-cassette housing shelf for video-cassette auto-changers in Japanese Patent Application No. 63-84591.

In this cassette housing shelf, when a large-sized cassette is inserted into a cassette housing portion formed thereupon, both sides of the cassette are guided by a pair of inside walls, respectively, and when a small-sized cassette is inserted into the cassette housing portion, both sides of the cassette are guided by a pair of guiding walls that are provided on the respective inner sides of the pair of inside walls.

Thus, center lines of both the large-sized cassette and the small-sized cassette coincide with that of the cassette housing portion.

The pair of guiding walls for the small-sized cassette are movable between the inside and the outside of the cassette housing portion, and when the large-sized cassette is inserted, a pair of detectors provided on both sides of a cassette inlet, detect the cassette, and thus, the pair of guiding walls are moved to the outside of the cassette housing portion by drive means, which is driven in response to control signals from the detectors.

However, in such prior shelf in which the center lines of the two kinds of cassettes coincide with that of the cassette housing portion, it is not easy to insert the small-sized cassette into the cassette housing portion through a cassette inlet, because the small-sized cassette must be inserted through the relatively larger cassette inlet, which has been formed to enable the large-sized cassette to pass therethrough, and then interposed between the pair of guiding walls which are spaced apart by a distance smaller than the width of the cassette inlet.

OBJECTS AND SUMMARY OF THE INVENTION

Accordingly, it is an object of the present invention to provide a various-sized-cassette housing shelf which avoids the above-described problem associated with the prior art.

Another object of the present invention is to provide a various-sized-cassette housing shelf in which a guiding block for a small-sized cassette is disposed adjacent to a cassette inlet of a cassette housing portion that is formed upon the shelf, so as not to interfere with insertion of a large-sized cassette into the cassette housing portion, so that it becomes easier to insert the small-sized cassette.

A further object of the invention is to provide a various-sized-cassette housing shelf in which a damper is provided to retard the speed of ejecting means only at a time of ejecting a cassette, so that even if a high spring constant is given to a cassette ejecting spring so as to securely eject a heavy cassette, a light cassette will not be too rapidly ejected from a cassette outlet, and thus, there is no need of preparing any stop for the light cassette near to the cassette outlet.

In accordance with one aspect of this invention, in a various-sized-cassette housing shelf on which either a large-sized cassette or a small-sized cassette can be selectively placed, the shelf comprises a pair of inside walls spaced apart for guiding both sides of the large-sized cassette therebetween when the large-sized cassette is inserted in a cassette housing portion formed upon the shelf; and a guiding device being movable between the inside of the cassette housing portion, where the guiding device cooperates with one of the pair of inside walls in order to guide opposite sides, respectively, of the small-sized cassette, and the outside of the cassette housing portion, where the device does not interfere with insertion of the large-sized cassette.

In a preferred embodiment of this invention, a pair of detection means are arranged near to and on both sides of a cassette inlet of the cassette housing portion, respectively, and simultaneously put in action so as to remove the guiding device from the cassette housing portion only when the large-sized cassette is inserted.

Moreover, a guiding block, which is movable between the inside and the outside of the cassette housing portion and urged toward the inside of the cassette housing portion, is arranged adjacent to a cassette inlet of the cassette housing portion, and has a first guiding surface for guiding the small-sized cassette toward the guiding device when the small-sized cassette is inserted through the cassette inlet, and a second guiding surface which is engageable by the large-sized cassette to remove the guiding block from the cassette housing portion.

In accordance with another aspect of this invention, in a various-sized-cassette housing shelf on which either a large-sized cassette or a small-sized cassette can be selectively placed, a pair of ejecting means is moved from a returned position to an advanced position by either the large-sized cassette or the small-sized cassette when such cassette is inserted into a cassette housing portion that is formed upon the shelf; a spring is provided for returning either of the pair of ejecting means from its advanced position to its returned position, and for ejecting the cassette which has been conveyed to its returned position with the respective ejecting means; and a damper retards the speed of the ejecting means while the pair of ejecting means is returned from its advanced position to its returned position.

The above, and other objects, features and advantages of this invention, will be apparent from the following detailed description of an illustrative embodiment thereof to be read in conjunction with the accompanying drawings, wherein like reference numerals identify the same or corresponding parts in the several views.

BRIEF DESCRIPTION OF THE DRAWINGS

FIGS. 2A to 2C are plan views of the guiding devices of FIG. 1, to which reference will be made in describing functions thereof;

FIGS. 5A and 5B are sectional views taken along line V—V on FIG. 2B;

FIGS. 8A and 8B are sectional views taken along line VIII—VIII on FIG. 6;

FIGS. 9A to 9E are plan views of a control mechanism for the various-sized housing shelf of FIGS. 2A to 2C;

FIG. 10 is a plan view of a damping device for a slider which is incorporated in the control mechanism of FIGS. 9A to 9E;

FIG. 11 is a sectional view taken along line XI—XI on FIG. 10; and

DETAILED DESCRIPTION OF A PREFERRED EMBODIMENT

Figure 12:
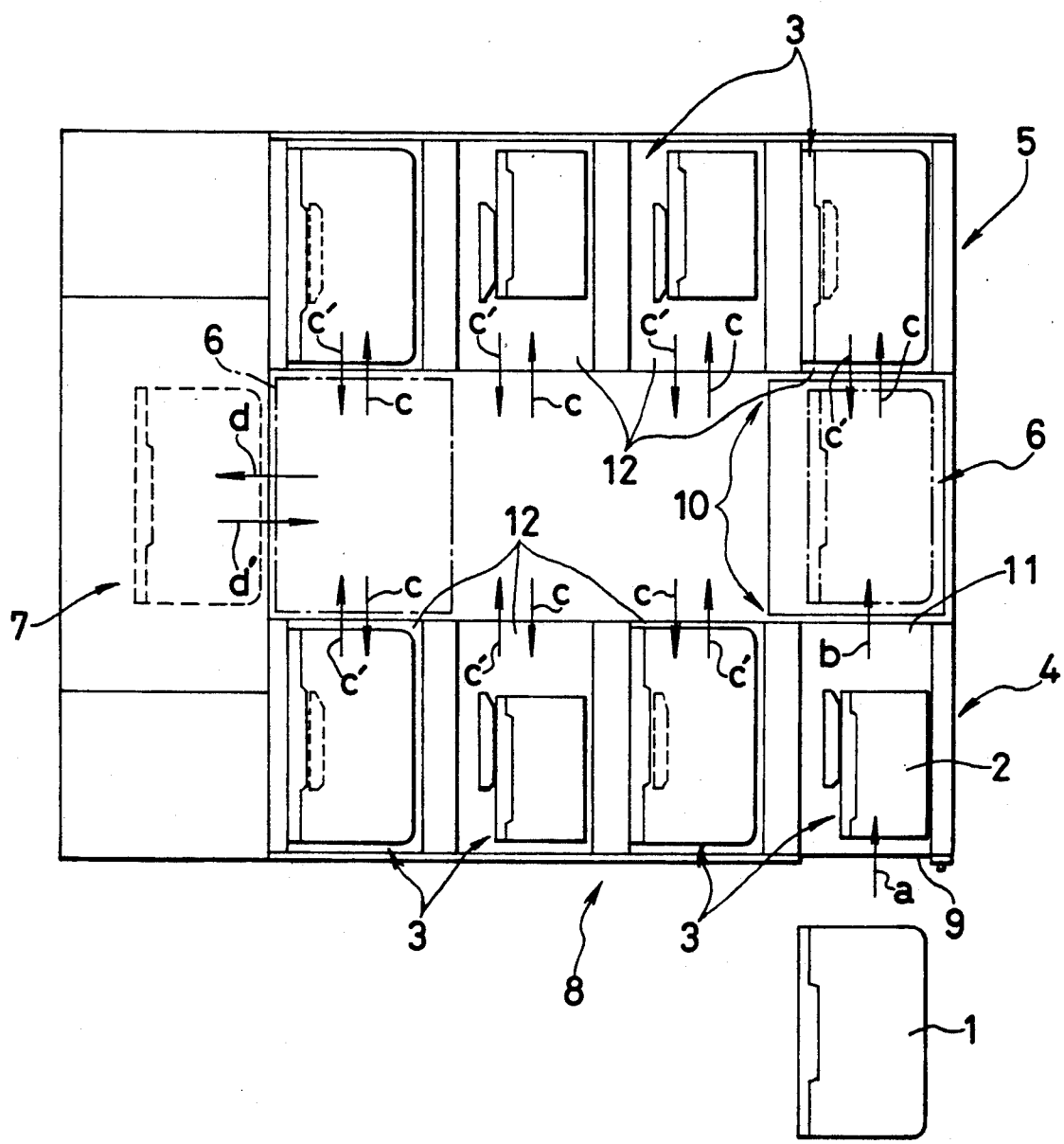
FIG. 12 is a plan view of a cassette auto-changer in which various-sized housing shelves according to an embodiment of this invention are incorporated.

Referring initially to FIG. 12, a cassette autochanger will be described. The cassette auto-changer usable for either of a large-sized cassette 1 and small-sized cassette 2 comprises a cassette conveyor 6, a front-side shelved cabinet 4, a rear-side shelved cabinet 4, and a plurality of recording and/or reproducing apparatuses 7.

In each cabinet 4, 5, a plurality of two-sized-cassette housing shelves 3, which can selectively accommodate either of the large-sized cassette and the small-sized cassette, are lined up in two dimensional directions. The cassette conveyor 6 arranged between the two cabinets 4, 5 can move also in two dimensional directions, and convey selectively either of the cassettes of two kinds from any one of the shelves 3 to any one of the recording and/or reproducing apparatuses 7, or vice versa. The recording and/or reproducing apparatuses 7 are of a front-loading type, and are lined up in a vertical direction.

A shelf 3 of the front-side shelved cabinet 4, shown at right end in FIG. 12, has a cassette inlet 9, through which the cassette 1, 2 is inserted in a direction of arrow a into the cabinet 4 by an operator standing in front of the cabinet 4. The inserted cassette 1, 2 is, then, automatically removed in a direction of arrow b from the shelf 3 through a cassette outlet 11 which is provided at the rear end of the shelf 3. At that time, a bar code on the cassette 1, 2 is read by a bar-code reader (not shown).

Thereafter, the cassette 1, 2 put on the cassette conveyor 6 is conveyed near to a shelf 3 having a predetermined address in response to signals from the bar-code reader, and inserted in a direction of arrow c into the shelf 3 through a cassette gate 12 which is provided at the rear end of the shelf 3 of the front-side cabinet 4 or at the front end of the shelf 3 of the rear-side cabinet 5.

When a selected cassette 1, 2 is to be used, the cassette 1, 2 put on the shelf 3, which has a specified address, is moved in a direction of arrow c' to the cassette conveyor 6. Thereafter, the cassette 1, 2 is conveyed near to a specified one of the recording and/or reproducing apparatuses 7 and automatically inserted in a direction of arrow d into the apparatus 7. Then, information is recorded on or reproduced from a recording medium housed in the cassette 1, 2.

When the recording or reproducing performance ends, the cassette 1, 2 is removed in a direction of arrow d' from the apparatus 7 onto the conveyor 6 so as to be automatically returned to the shelf 3 where it was stored. Thus, continuous, long-time recording or reproducing can be performed due to repetition of the action mentioned above.

At that time, it is preferable to use the large-sized cassette 1 or the small-sized cassette 2 selectively so as to meet the length of broadcasting time. For example, when commercials and the like are broadcasted, the small-sized cassette 2 should be used, and when news or long-time pictures are broadcasted, the large-sized cassette 1 should be used.

Figure 2A:
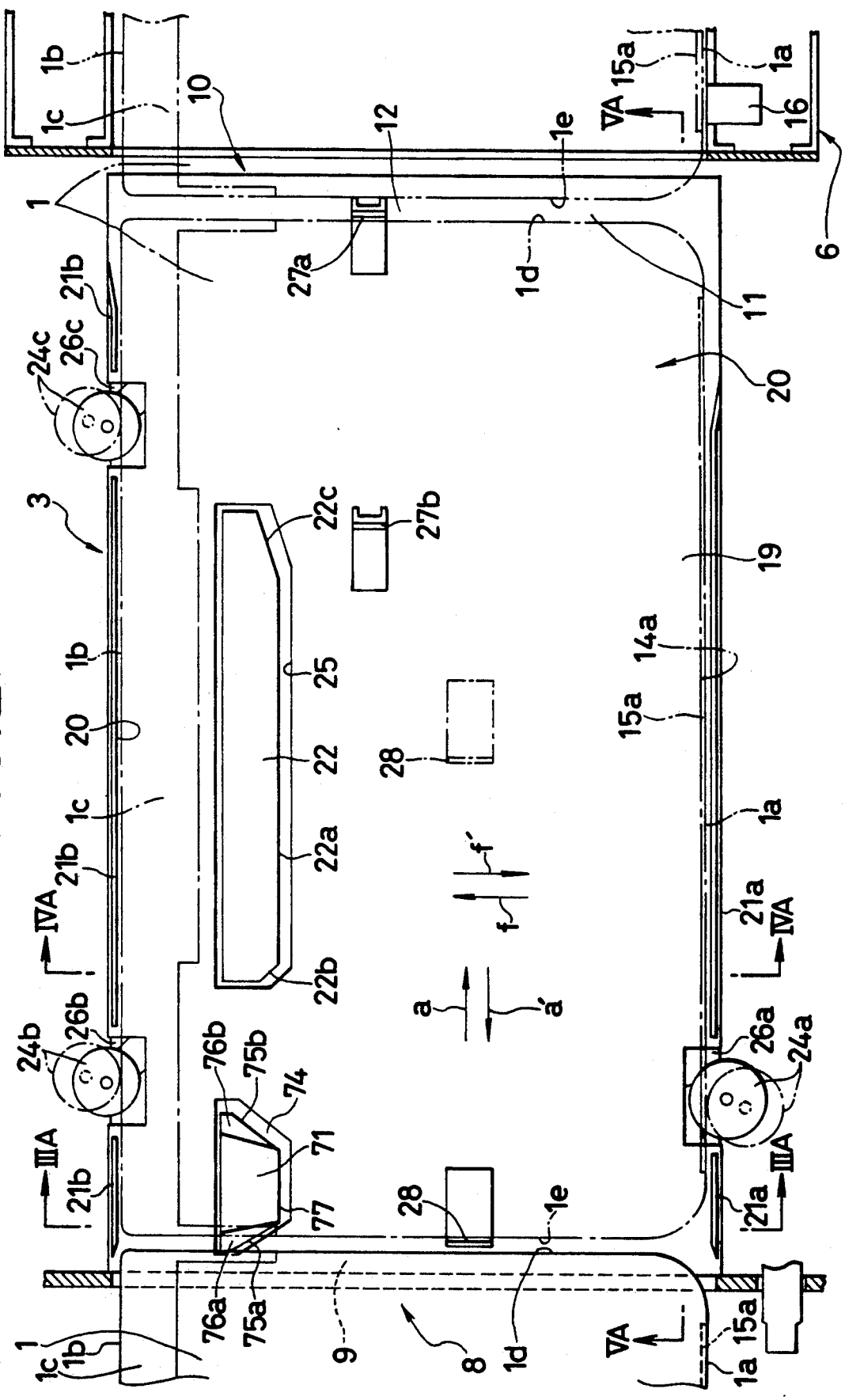

As shown in FIG. 5A, bar-code labels 15a, 15b, on each of which a bar-code 14a, 14b is printed, are stuck on one side surfaces 1a, 2a of the cassettes 1, 2, respectively, and as shown in FIGS. 2A and 2B, to the other sides 1b, 2b of the cassettes 1, 2 there are secured lids 1c, 2c, respectively. Further, a bar-code reader 16 (FIGS. 5A, 5B) for reading the bar-codes codes 14a, 14b is provided in the cassette conveyor 6.

Figure 3A:
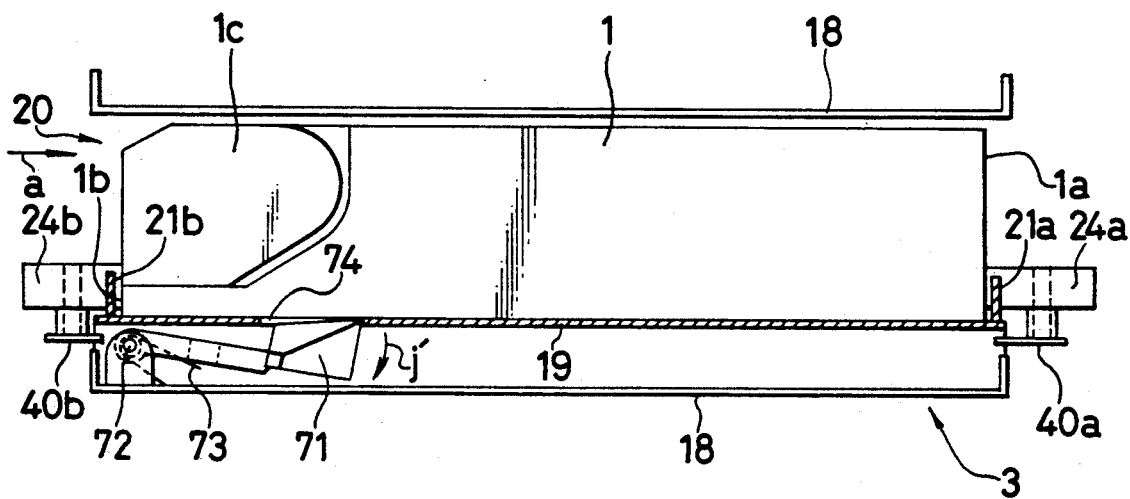
FIGS. 3A and 3B are sectional views taken along line IIIA—IIIA on FIG. 2A and line IIIB—IIIB on FIG. 2B, respectively.
Figure 3B:
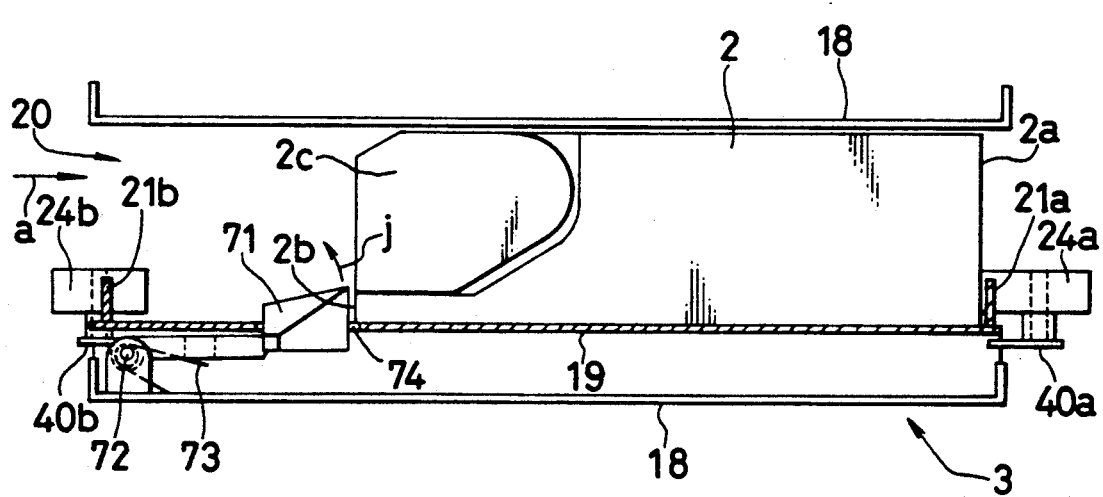

As shown in FIGS. 3A and 3B, each housing shelf 3 comprises a rack 18 made of sheet metal and a shelf plate 19 made of synthetic resin and mounted horizontally on the rack 18, and a cassette housing portion 20 is formed between the shelf plate 19 and another rack 18 positioned over the shelf plate 19.

As shown in FIGS. 2A and 2B, a cassette inlet 9 and a cassette outlet 11 are provided on the operator side 8 and the cassette-conveyor side of the cassette housing portion 20, respectively. The cassette 1, 2 is inserted in the direction of arrow a into the cassette housing portion 20 through the cassette inlet 9.

As shown in FIG. 2A, a pair of inside walls 21a, 21b are provided on both sides of the shelf plate 19. The inside walls 21a, 21b come in sliding contact with the respective side surfaces 1a, 1b to guide the large-sized cassette 1.

Moreover, a device 22 for guiding the small-sized cassette 2 in co-operation with the inside wall 21a is provided in the shelf plate 19. A guiding surface 22a of the guiding device 22 faces the inside wall 21a and extends in parallel with the inside wall 21a, and as shown in FIG. 2B, both the sides 2a, 2b of the small-sized cassette 2 come in sliding contact with the inside wall 21a and the guiding surface 22a, respectively.

Figure 1:
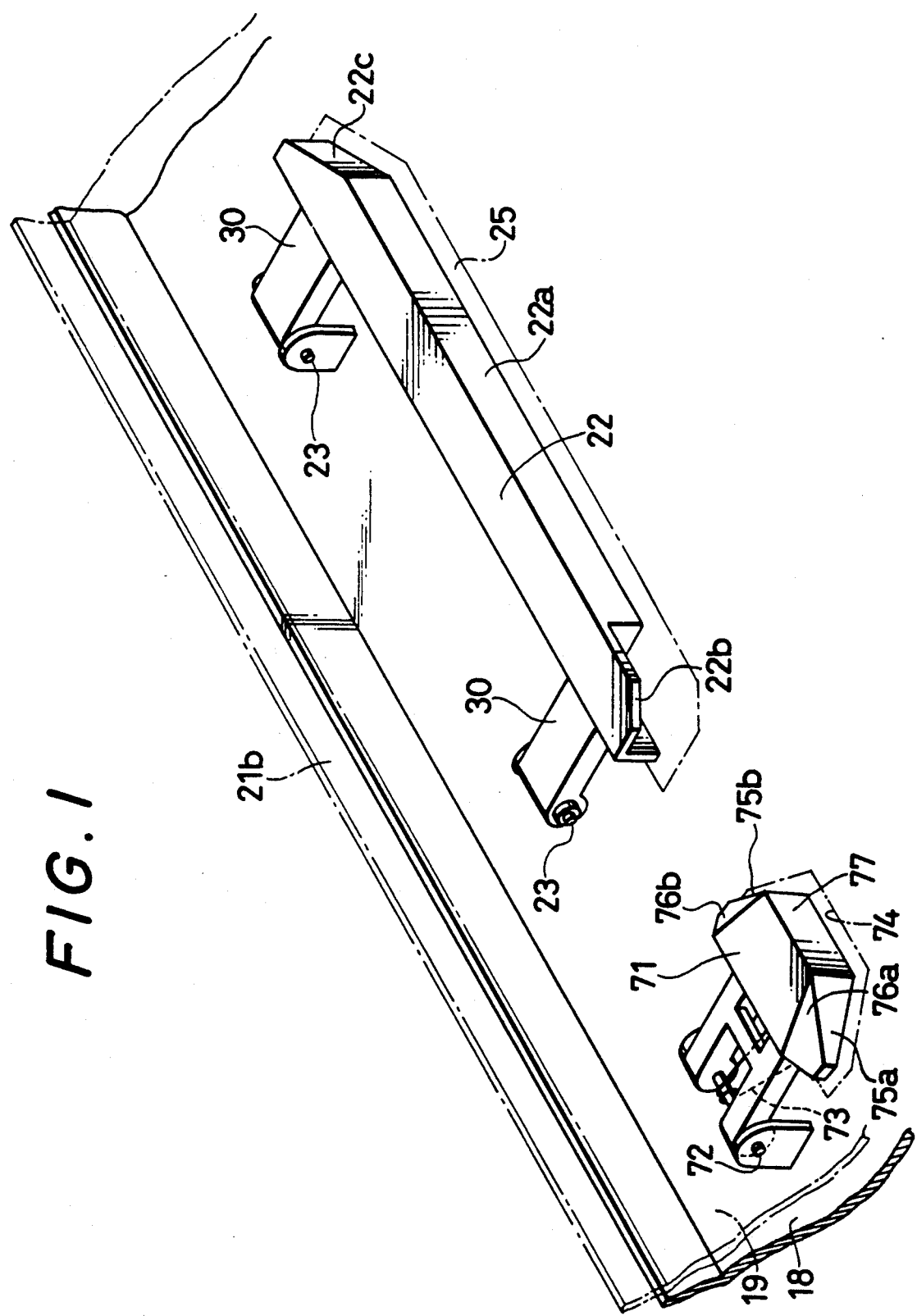
FIG. 1 is a perspective view of a set of guiding devices for a small-sized cassette, provided in a various-sized-cassette housing shelf according to an embodiment of this invention.
Figure 4A:
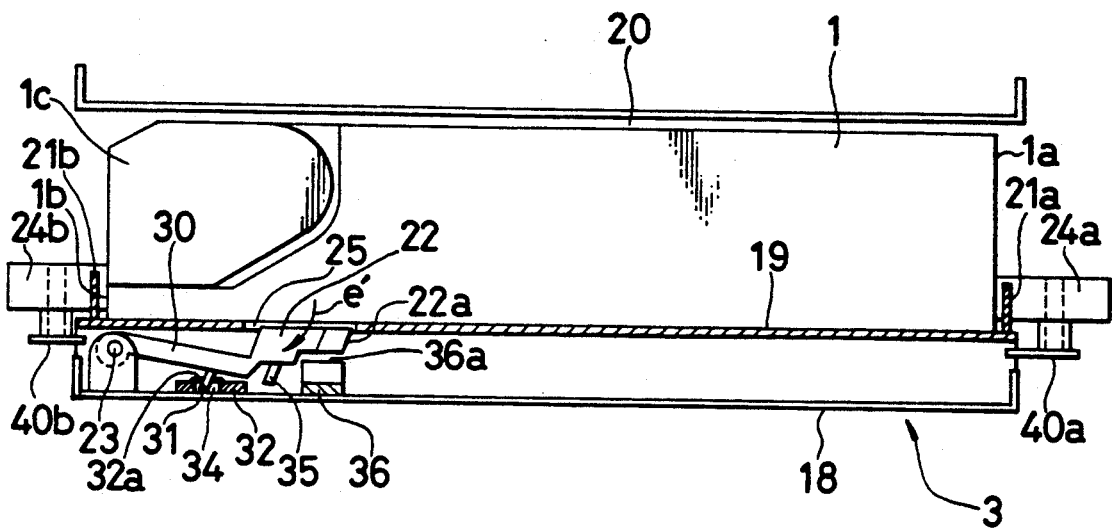
FIGS. 4A and 4B are sectional views taken along line IVA—IVA of FIG. 2A and line IVB—IVB on FIG. 2B, respectively.
Figure 4B:
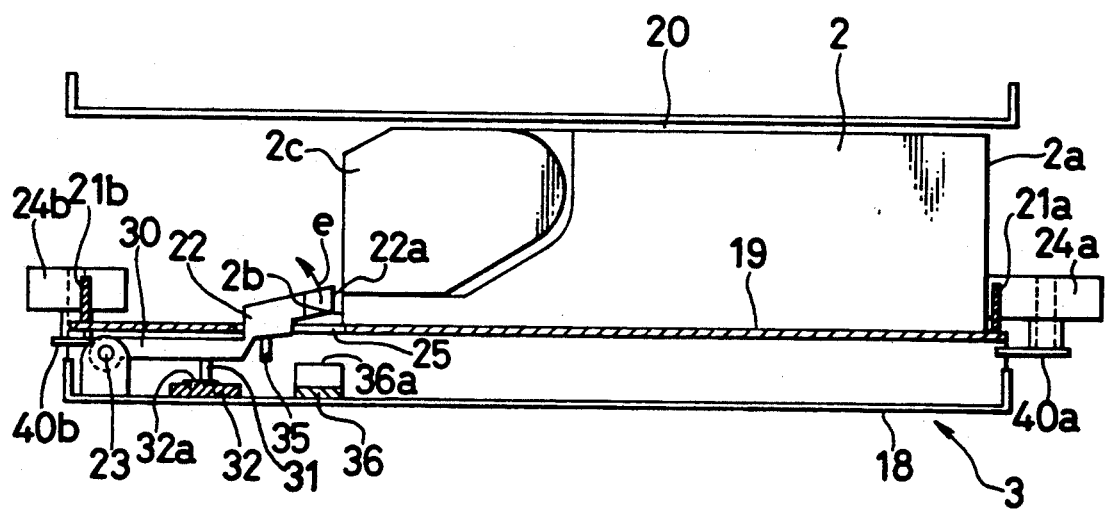

As shown in FIG. 1, a pair of arms 30 extending from the guiding device 22 pivot on respective shafts 23 which are supported by the rack 18, so that the guiding device 22 is rockable in a direction of arrows e, e' in FIGS. 4A and 4B on the shafts 23, and therefore, the guiding device 22 is movable between the inside and the outside of the cassette housing portion 20 through an elongate opening 25 which is provided in the shelf plate 19. It is noted that a pair of slanted surfaces 22b, 22c shown in FIG. 2A are provided at both ends of the guiding device 22.

As shown in FIGS. 1 and 2B, a substantially trapezoidal guiding or steering block 71 is provided adjacent to the cassette inlet 9 of the cassette housing portion 20 to be in alignment with the guiding device 22. The guiding block 71 is rockable in a direction of arrows j, j' in FIGS. 3A and 3B on a shaft 72 which is supported by the rack 18. Thus, the guiding block 71 can be movable between the inside and the outside of the cassette housing portion 20 through a substantially trapezoidal opening 74 which is provided in the shelf plate 19. Further, the guiding block 71 is urged in the direction of arrow j by the force of a spring 72, which surrounds the shaft 72, so as to be positioned inside of the cassette housing portion 20.

As shown in FIGS. 1 and 2A, the guiding block 71 has, at the ends thereof facing the operator side 8 and the cassette-conveyor side 10 thereof, a pair of first guiding surfaces 75a, 75b for guiding the small-sized cassette 2 so as to make the cassette 2 interpose between the inside wall 21a and the guiding surface 22a of the device 22, and a pair of second guiding surfaces 76a, 76b, which are engageable by the large-sized cassette 1 so as to downwardly deflect the guiding block 71 from within the cassette housing portion 20 against the force of the spring 73. A guiding surface 77 of the guiding block 71 faces the inside wall 21a and extends in parallel with the inside wall 21a.

As shown in FIG. 2A, a pair of detection rollers 24a, 24b for detecting the large-sized cassette 1 are provided adjacent to both ends of the cassette inlet 9. Further, another detection roller 24c for detecting the large-sized cassette 1 is provided adjacent one end of the cassette outlet 11. The detection rollers 24b and 24c are interlocked with each other.

The detection rollers 24a, 24b and 24c are movable in the directions of arrows f, f' between the inside and the outside of the cassette housing portion 20 through slots 26a, 26b and 26c which are provided in the inside walls 21a, 21b, respectively. Further, as shown in FIGS. 5A and 5B, ejecting means 27a for the large-sized cassette 1, ejecting means 27b for the small-sized cassette 2, and sending means 28 for both the cassettes 1, 2 are provided to be projectable into the cassette housing portion 20 through respective slots disposed in the shelf plate 19.

In a state when neither cassette 1 or 2 is inserted, the detection rollers 24a, 24b and 24c project into the cassette housing portion 20 as indicated in solid lines in FIG. 2A, and the guiding device 22 and the guiding block 71 are inside the cassette housing portion 20 as shown in FIGS. 4B and 3B, respectively.

When a corner of the cassette 2 comes in contact with the first guiding surface 75a of the guiding block 71 during insertion of the small-sized cassette 2, as shown in FIG. 2B, the cassette 2 is guided in a direction of arrow a'' by the first guiding surface 75a as the cassette 2 is inserted. Thus, it is easy to interpose the cassette 2 between the inside wall 21a and the guiding surface 22a of the guiding device 22, even though the width of the cassette inlet 9, which has been formed to meet the width of the large-sized cassette 1, is much larger than that of the small-sized cassette 2.

At the time of the small-sized cassette 2 being inserted in the direction of arrow a in FIG. 2B, the detection roller 24a comes in contact with the side surface 2a of the small-sized cassette 2 and is moved in the direction of arrow f', but the guiding device 22 is kept inside of the cassette housing portion 20 as shown in FIG. 4B.

Moreover, when the cassette 2 is inserted, the ejecting means 27b is pushed in the direction of arrow a by the front side 2d of the cassette 2, and when the cassette 2 reaches a predetermined position indicated in chain-dotted lines in FIG. 2B, or in solid lines in FIG. 5A, the ejecting means 27b is locked to stop the cassette 2, and substantially at the same time, the sending means 28 shown in FIG. 5A is moved in a direction of arrow g from a position indicated in chain-dotted lines to another position indicated in solid lines, and is engaged with the rear side 2e of the cassette 2.

Thereafter, when operating means for operating the cassette conveyor 6 is actuated, the ejecting means 27b is rotated in a direction of arrow h from a position indicated in solid lines to another position indicated in chain-dotted lines in FIG. 5A, and the cassette 2 is moved in the direction of arrow a toward the cassette conveyor 6 by the sending means 28.

After passing through the cassette outlet 11, the cassette 2 is put on a conveyor belt (not shown) within the cassette conveyor 6, and at that time, the bar-code 14b of the small-sized cassette 2 is automatically read by the bar-code reader 16.

As shown in FIGS. 2A and 3A, when the large-sized cassette 1 is inserted, in the direction of arrow a, into the cassette housing portion 20 through the cassette inlet 9, the lower edge of the front side 1d of the cassette 1 comes (i) into contact with the second guiding surface 76a of the guiding block 71, so that the guiding block 71 is rocked in the direction of arrow j' in FIG. 3A against the force of the spring 73 and positioned outside of the cassette housing portion 20. Thus, the guiding block 71 does not interfere with the large-sized cassette 1 being inserted, so that it is easy to interpose the cassette between the pair of inside walls 21a and 21b.

As shown in FIG. 2A, when the large-sized cassette 1 is inserted in the direction of arrow a, the pair of detection rollers 24a, 24b are pushed by the side surfaces 1a, 1b of the cassette 1 and moved toward the outside of the cassette housing portion 20, and as a result, the guiding device 22 for the small-sized cassette 2 is moved in a direction of arrow e' in FIG. 4A toward the outside of the cassette housing portion 20, and also, the ejecting means 27b is removed in a direction of arrow h in FIG. 5A from a position indicated in solid lines to another position indicated in chain-dotted lines. Thus, the large-sized cassette 1 can easily be inserted into the cassette housing portion 20 without interference from the guiding device 22 and ejecting means 27b.

At that time, the ejecting means 27a is pushed in the direction of arrow a by the front side 1d of the cassette 1, and when the cassette 1 reaches a predetermined position shown in FIG. 2A, the ejecting means 27a is looked to stop the cassette 1, and substantially at the same time, the sending means 28 shown in FIG. 5A is rotated in a direction of arrow g from a position indicated in chain-dotted lines to another position indicated in solid lines so as to be engaged with the rear side 1e of the cassette 1.

Thereafter, when the operating means of the cassette conveyor 6 is actuated, the ejecting means 27A is rotated from an engaged position indicated in solid lines in FIG. 5A to a disengaged position indicated in chain-dotted lines, so that the large-sized cassette 1 is moved in the direction of arrow a by the sending means 28 toward the cassette conveyor 6. After passing through the cassette outlet 11, the large-sized cassette 1 is put on the conveyor belt within the cassette conveyor 6 in the same manner as the small-sized cassette 2. The bar code 14a of the large-size cassette 1 is read by the bar-code reader 16 during the movement of the cassette 1. That is, the side surfaces 1a, 2a of the cassettes 1, 2 on which the bar-code labels 15a, 15b have been stuck, occupy the same position relative to the inside wall 21a when the cassettes 1, 2 are inserted, so that only one bar-code reader 16 is enough to read the bar codes 14a, 14b of the cassettes 1, 2.

Moreover, only when the large-sized cassette 1 is inserted in the direction of arrow a and thereby, the pair of detection rollers 24a and 24b are displaced from within the cassette housing portion 20, the guiding device 22 is removed from the inside of the cassette housing portion 20 as shown in FIG. 4A, so that when the small-sized cassette 2 is inserted, the cassette 2 can be always interposed between the inside wall 21a and the guiding surface 22a of the guiding device 22.

As shown in FIG. 2C, if the small-sized cassette 2 is inserted in the direction of arrow a along the other inside wall 21b through the cassette inlet 9, the guiding block 71 and the detection roller 24b are removed from the cassette housing portion 20, but the cassette 2 is stopped in the midst of insertion into the cassette housing portion 20, because the front side 2d of the cassette 2 abuts against the guiding device 22, and the cassette 2 is prevented from inserting into the cassette housing portion 20.

As shown in FIG. 2A, when the cassette 1, 2 is returned in the direction of arrow a' from the cassette conveyor 6 to the cassette housing portion 20 through the cassette outlet 11, the large-sized cassette 1 is securely interposed between the inside walls 21a, 21b, and also, the small-sized cassette 2 is securely interposed between the inside wall 21a and the guiding surface 22a of the guiding device 22 due to the functioning of the conveyor belt of the cassette conveyor 6.

At that time, as the ejecting means 27a, 27b have been moved in the direction of arrow h and locked, they do not interfere with the cassette 1, 2 being inserted. When the large-sized cassette is inserted in the direction of arrow a', the detection roller 24c is removed in the direction of arrow f' from the cassette housing portion 20. As hereinafter described, the guiding device 22 is thereby removed in the direction of arrow e' in FIG. 4A from the cassette housing portion 20, so that the large-sized cassette 1 is not prevented from being inserted into the cassette housing portion 20. Further, just before the large-sized cassette 1 reaches its predetermined position in the cassette housing portion 20, the lower edge of the rear side 1e of the large-sized cassette 1 abuts against the second guiding surface 76b of the guiding block 71, so that the guiding block 71 is removed in the direction of arrow j' in FIG. 3A from the cassette housing portion 20.

Moreover, when the cassette 1, 2 is inserted as described above, the rear side 1e, 2e of the cassette 1, 2 abuts against the sending means 28 and moves the sending means 28 in the direction of arrow a'. When the cassette 1, 2, reaches its predetermined position, the ejecting means 27a, 27b is rotated in the direction of arrow h' in FIG. 5A, and engages the front side 1d, 2d of the cassette 1, 2.

Thereafter, if an operator actuates a cassette ejecting device, the sending means 28 is removed in the direction of arrow g' in FIG. 5A, and the cassette 1, 2 is automatically ejected in the direction of arrow a' through the cassette inlet 9 due to functioning of the ejecting means 27a, 27b.

Figure 6:
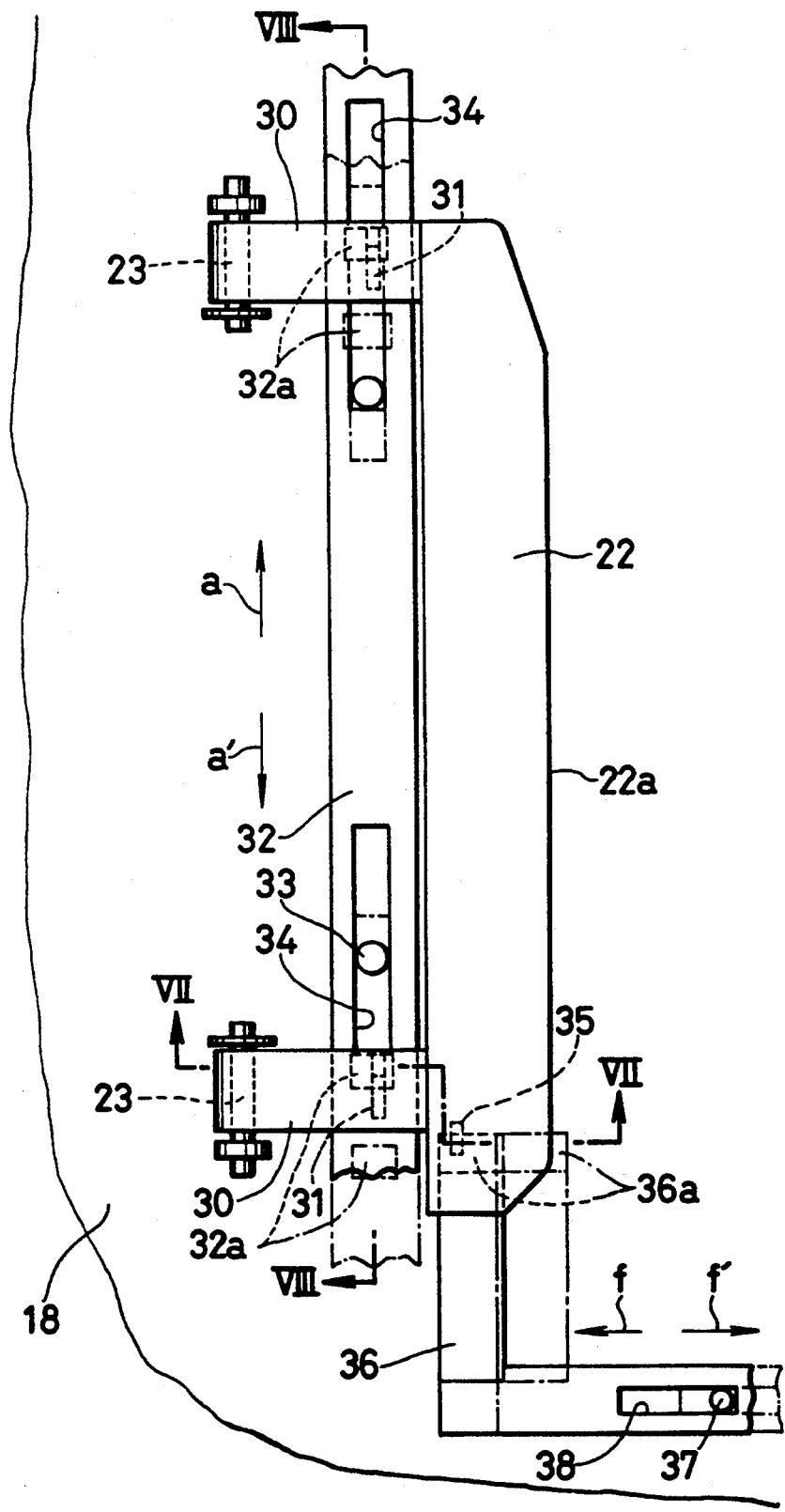
FIG. 6 is a plan view of one of the guiding devices of FIG. 1, provided for showing a drive mechanism thereof.
Figure 7A:
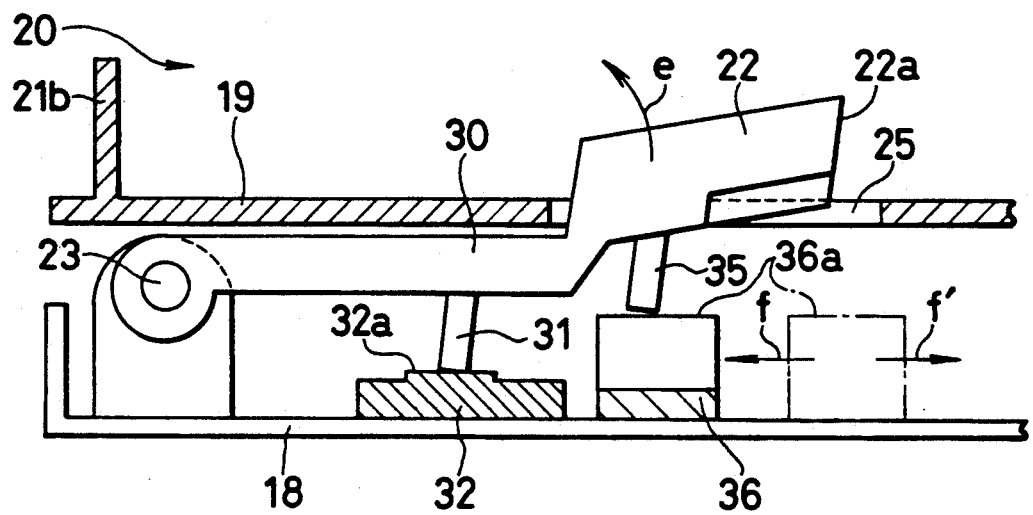
FIGS. 7A and 7B are sectional views taken along line VII—VII on FIG. 6.
Figure 7B:
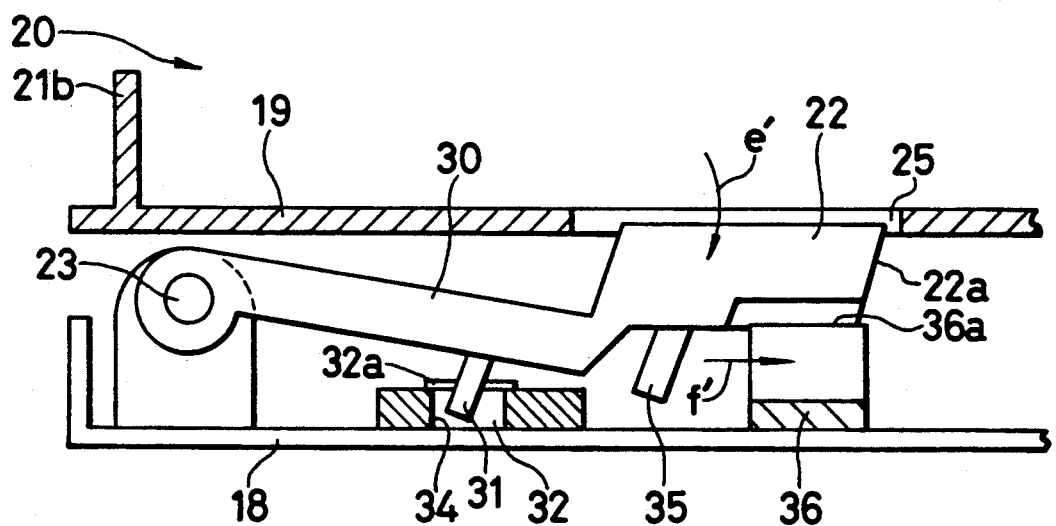

The guiding device 22 is desirably made of synthetic resin or the like. As shown in FIGS. 6, 7A and 7B, a pair of arms 30 project from the side of guiding device 22 opposite to the side where the guiding surface 22a lies, and the free ends of the arms 30 are rotatably secured to the rack 18 through shafts 23, so that the guiding device 22 is swingable in the direction of arrows e, e' about the shafts 23.

A projection 31 having an inclined surface 31a (FIG. 8A) projects substantially vertically from the lower surface of each arm 30 of the guiding device 22. A locking bar 32 arranged just under the pair of projections 31 is slidable in the direction of arrows a, a' on the rack 18. That is, the locking bar 32 has three long slots 34 along the longitudinal axis thereof as shown in FIG. 9A, and three guide pins 33 projecting from the rack 18 are fitted into the respective slots 34 to guide the locking bar 32.

Moreover, as shown in FIGS. 7A and 9A, another projection 35 projects substantially vertically from the lower surface of the guiding device 22. An L-shaped locking bar 36 extends just under the projection 35 and is slidable in the direction of arrows f, f' on the rack 18. That is, the L-shaped locking bar 36 shown in FIG. 9A has two long slots 38, and two guide pins 37 projecting from the rack 18 are fitted into the respective slots 38 to guide the locking bar 36.

A drive mechanism of the guiding device 22 will be hereinafter described. Initially as shown in FIG. 6, when the locking bars 32 and 36 are moved in the directions of arrows a and f from positions indicated in chain-dotted lines to positions indicated in solid lines, respectively, the pair of projections 31 of the guiding device 22 rest on slightly elevated portions 32a of the looking bar 32 as shown in FIG. 8A, after each being raised by the action of the inclined surface 31a of the projection 31, and as shown in FIG. 7A, the guiding device 22 is thereby rocked in the direction of arrow e through the opening 25 and projects into the cassette housing portion 20. Further, an elevated portion 36a of the locking bar 36 is inserted under the projection 35 as shown in FIG. 7A.

When the locking bars 32 and 36 are returned in the directions of arrows a' and f' from positions indicated in solid lines in FIG. 6 to positions indicated in chain-dotted lines, respectively, the pair of projections 31 are fitted into the respective slots 34 of the locking bar 32 as shown in FIG. 8B, and as shown in FIG. 7B, the elevated portion 36a of the locking bar 36 is removed from under the projection 35. Thus, the guiding device 22 descends in the direction of arrow e' by gravity and is removed from the cassette housing portion 20 as shown in FIG. 7B. It is to be noted that a spring (not shown) may be provided to urge the guiding device 22 in the direction of arrow e'.

Incidentally, if only the locking bar 36 shown in FIG. 7A is moved in the direction of arrow f' to the position indicated in chain-dotted lines, or if only the locking bar 32 is moved in the direction of arrow a' to the position shown in FIG. 8B, it is impossible to rock the guiding device 22 in the direction of arrow e'. Only when both the locking bars 32 and 36 are moved in the directions of arrows a' and f', respectively, the guiding device 22 can be rocked in the direction of arrow e' and is removed from the cassette housing portion 20.

Referring to FIGS. 9A to 9E, a control mechanism of the housing shelf 3 will be hereinafter described. FIG. 9A is a plan view of the control mechanism shown in the state thereof when the cassette 1, 2 has not yet been inserted. In FIG. 9A, a lever 40a having the detection roller 24a mounted at its free end is rotatable on a shaft 41a which projects from the rack 18, and urged in the direction of arrow f by the force of a spring 42a.

Next, levers 40b and 40c having the respective detection rollers 24b and 24c mounted at their free ends are rotatable on respective shafts 41b and 41c. A pair of arms 43 project from the locking bar 32 near to the respective ends thereof, and a pin 44 projecting from the distal end of each arm 43 is fitted into an elongate hole 45 provided at the distal end of an arm, which is integral with each lever 40b, 40c and which is at right angle with the lever 40b, 40c, respectively. Thus, the levers 40b and 40c are interlocked with each other, through the locking bar 32.

A slider 48 has a pair of long slots 47 in parallel with the longitudinal axis thereof, and a pair of guide pins 46 projecting from the rack 18 are fitted into the pair of slots 47, respectively, so that the slider 48 is slidable in the directions of arrows a, a'. The slider 48 is urged in the direction of arrow a' by the force of a spring 49. It is noted that a pair of shafts 50a, 50b are supported by the slider 48, and the ejecting means 27a, 27b are rotatable in the directions of arrows h, h' in FIG. 5A on the respective shafts 50a, 50b.

A locking lever 51 is rotatable in the directions of arrows i, i' on a shaft 52 projecting from the rack 18. The locking lever 51 has three arms with a locking pin 53 projecting from the first arm for engaging with a stepped portion 54 provided near to one end of the slider 48, and a pin 55 projecting from the second arm being fitted into the slot 38 of the locking bar 36.

A pin 57 is projected from the distal end of the lever 40a, and fitted into an elongate hole 56 provided at the end of the locking bar 36 which is opposite to the end where the elevated portion 36a of the locking bar 36 has been provided.

Arranged over the locking bar 32 substantially at right angles thereto is a slider 58, which has a pair of elongate holes 60 in parallel with the longitudinal axis thereof, and a pair of guide pins 59 projecting from the rack 18 are fitted into the respective elongate holes 60, so that the slider 58 is slidable in the directions of arrows f, f'. The slider 58 is urged in the direction of arrow f by the force of a spring 61.

A pin 62 projecting from the slider 58 is positioned near to an inclined surface 63 that is formed on the locking bar 32. A pair of elongated holes 65 are provided in a head portion disposed at an end of the slider 58 and which extends in the direction of arrows a, a'. A control plate 64 for controlling the ejecting means 27b has a pair of pins 66 to be fitted into the respective elongated holes 65 of the slider 58. Thus, the control plate 64 lying above the slider 48 is movable in the direction of arrows f, f' together with the slider 58, and is movable in the direction of arrows a, a' within a limited range.

As shown in FIG. 9B, when the large-sized cassette 1 is inserted in the direction of arrow a toward the cassette housing portion 20, the detection rollers 24a and 24b are removed from the cassette housing portion 20, so that the levers 40a and 40b are rotated against the springs 42a and 42b, respectively. Thus, the locking bar 32 is moved in the direction of arrow a', and also, the locking bar 36 engaged with the lever 40a through the elongate hole 56 and pin 57 is moved in the direction of arrow f', so that the guiding device 22 is removed in the direction of arrow e' from the cassette housing portion 20 as shown in FIG. 7B. Further, the pin 62 of the slider 58 is pressed by the inclined surface 63 of the locking bar 32, and as the locking bar 32 is moved in the direction of arrow a', the slider 58 is moved in the direction of arrow f' against the force of the spring 61, so that the control plate 64 engaged with the slider 58 through the elongate holes 65 and pins 66 is also moved in the direction of arrow f'. Thus, the ejecting means 27b is removed in the direction of arrow h' in FIG. 5A from the cassette housing portion 20.

As the front side 1d of the large-sized cassette 1 being inserted in the direction of arrow a into the cassette housing portion 20 pushes the ejecting means 27a, the slider 48 is moved in the direction of arrow a against the force of the spring 49, and as soon as the large-sized cassette 1 reaches the predetermined position in the cassette housing portion 20, the locking lever 51 is rotated in the direction of arrow i, and the locking pin 53 of the lever 51 is engaged with the stepped portion 54 of the slider 48 to lock the slider 48.

At the same time, the pin 55 of the locking lever 51 abuts against one nd of the respective slot 38 of the locking bar 36 so that the locking bar 36 is held against movement in the direction of arrow f, and as shown in FIG. 5A, the sending means 28 is rotated in a direction of arrow g to be engaged the rear side 1e of the large-sized cassette 1.

As shown in FIG. 9C, when the small-sized cassette 2 is inserted in the direction of arrow a into the cassette housing portion 20, only the detection roller 24a is removed in the direction of arrow f' from the cassette housing portion 20, and the locking bar 36 drawn by the lever 40a is moved in the direction of arrow f'. As the detection roller 24b is, however, not removed, the locking bar 32 is left as it is.

Thus, the guiding device 22 is also left as it is, and the small-sized cassette 2 can be inserted so as to be interposed between the guiding device 22 and the inside wall 21a.

As the cassette 2 is inserted into the cassette housing portion 20, the front side 2d of the cassette 2 pushes the ejecting means 27b, so that the slider 48 is moved in the direction of arrow a against the force of the spring 49 until the slider 48 is locked with the locking lever 51. In addition, as shown in FIG. 5A, the sending means 28 is rotated in the direction of arrow g, and engaged with the rear side 2e of the cassette 2.

As shown in FIG. 9D, when the large-sized cassette 1 is returned in the direction of arrow a' from the cassette conveyor 6 to the cassette housing portion 20, the detection roller 24c is removed in the direction of arrow f from the cassette housing portion 20, while the locking bar 36 is left as it is due to locking function of the locking lever 52.

Thus, the arm 43 of the locking bar 32 is pushed to move the locking bar 32 in the direction of arrow a', so that the guiding device 22 is removed in the direction of arrow e' in FIG. 7B from the cassette housing portion 20 in order not to interfere with the insertion of the large-sized cassette 1.

As the cassette 1 is inserted into the cassette housing portion 20, the sending means 28 is pushed by the rear end 1e of the cassette 1 to be moved in the direction of arrow a', and immediately when the cassette 1 reaches the predetermined position shown in FIG. 9B, the ejecting means 27a is rotated in the direction of arrow h' in FIG. 5A and engaged the front side 1d of the cassette 1.

As shown in FIG. 9E, when the small-sized cassette 2 is returned in the direction of arrow a' from the cassette conveyor 6 to the cassette housing portion 20, the cassette 2 is interposed between the inside wall 21a and the guiding surface 22a of the guiding device 22, because the detection roller 24c is not removed from the cassette housing portion 20. It is noted that after being removed from the conveyor belt of the cassette conveyor 6 to the cassette housing portion 20, the small-sized cassette 2 is pushed by a pusher 67 shown in FIG. 9E, which is disposed in the cassette conveyor 6, until the cassette 2 reaches the predetermined position shown in FIG. 9C.

In addition, as the cassette 2 is inserted into the cassette housing portion 20, the sending means 28 is pushed by the rear end 2e of the cassette 2 to be moved in the direction of arrow a', and immediately when the cassette 2 reaches the predetermined position shown in FIG. 9C, the ejecting means 27b is rotated in the direction of arrow h' in FIG. 5A and engaged with the front side 2d of the cassette 2.

As soon as an ejecting operation is initiated by the operator after the cassette 1, 2 has been returned to the cassette housing portion 20, the locking lever 51 moves in the direction of arrow i' as shown in FIG. 9A, so that the sending means 28 is removed in the direction of arrow g' in FIG. 5A, and at the same time, the locking pin 53 of the lever 51 is disengaged from the stepped portion 54 of the slider 48 so that the slider may be moved in the direction of arrow a' by the force of the spring 49. Thus, the cassette 1, 2 is pushed by the ejecting means 27a, 27b and ejected from the cassette housing portion 20 through the cassette inlet 9.

Referring to FIGS. 10 and 11, a damper 85 combined with the slider 48 will be hereinafter described. As shown in FIG. 10, the damper 85 is secured to the rack 18 (FIG. 11) on one side of the slider 48, and gear rack 86 is formed in that side of the slider 48 so as to face the damper 85. A shaft 89 is projected from the rack 18 as shown in FIG. 11, and a large gear 87 and a small gear 88 formed integrally with the large gear 87 are rotatable on the shaft 89. Further, the large gear 87 is meshed with the gear rack 86.

As shown in FIG. 11, a gear 91 for driving the damper 85 is rotatably mounted on a fixed shaft 90, which extends vertically downwards from the case 85a of the damper 85. Further, a small gear 92 is also rotatably mounted on the fixed shaft 90 under the drive gear 91. The small gear 92 is connected to the drive gear 91 through a one-way clutch 93, and is meshed with the small gear 88.

When the slider 48 is moved in the direction of arrow a from the position shown in FIG. 9A to the position shown in FIG. 9B by the inserted cassette 1, 2 through the ejecting means 27a, 27b, the small gear 92 shown in FIG. 10 is driven by the slider 48 through the rack 86, large gear 87 and small gear 88, and rotated in a direction of arrow m in FIG. 10. However, the torque of the small gear 92 rotated in the direction of the arrow m' is not transmitted to the drive gear 91 by the one-way clutch 93, so that the cassette 1, 2 is easily inserted without encountering resistance from the damper 85.

When the slider 48 is moved in the direction of arrow a' from the position shown in FIG. 9B to the position shown on FIG. 9A in order to eject the cassette 1, 2 and the cassette 1, 2 is then pushed out of the cassette housing portion 20 by the ejecting means 27a, 27b of the slider 48 through the cassette inlet 9, the small gear 92 is rotated in a direction of arrow m', so that the torque of the small gear 92 is transmitted to the drive gear 91 through the one-way clutch 93. Thus, the speed of the slider 48 is retarded due to function of the damper 85, and the cassette 1, 2 is ejected always at a suitable speed.

Various modifications are possible within the scope of the appended claims. For example, if a spring is provided to urge the guiding device 22 in the direction of arrow e as shown in FIG. 4B and if the large-sized cassette 1 is to abut against the guiding device 22 an remove the guiding device 22 from the cassette housing portion 20 against the force of the spring ,it is only necessary to provide the same guiding surfaces as those at 75a, 75b on the guiding block 71 at a front end and a rear end of the guiding device 22, respectively, to lead the small-sized cassette 2 to the predetermined position where the cassette 2 is interposed between the inside wall 21a and the guiding surface 22a of the guiding device 22.

What is claimed is:

1. A cassette housing shelf for selectively accommodating relatively large-sized and small-sized cassettes which respectively have relatively large and small widths, comprising: a horizontal shelf-plate having a cassette-bearing surface with parallel opposite side margins; upstanding side walls extending from said side margins of the shelf plate and between which a cassette-receiving space is defined above said cassette-bearing surface with an inlet at one end of said shelf plate, said side walls being spaced apart by a distance approximately equal to said relatively large width of the large-sized cassette so that the latter is laterally guided by said side walls when inserted through said inlet into said cassette-receiving space; an elongated guiding element extending generally parallel to said side walls and being movable between a raised operative position above said cassette-bearing surface and a depressed inoperative position submerged relative to said cassette-bearing surface, said guiding element in said operative position being spaced from one of said side walls by a distance approximately equal to said relatively small width of the small-sized cassette so that the latter can be laterally guided between said guiding element and said one side wall when said small-sized cassette is inserted through said inlet into said cassette-receiving space; first and second sensing elements disposed adjacent said inlet at said one side wall and the other of said side walls, respectively, and being movable independently of each other between inner positions where said sensing elements project beyond said side walls at least partly into said cassette-receiving space and outer positions withdrawn from said space; means yieldably urging said sensing elements to said inner positions thereof; means responsive to movement of said second sensing element to said inner position thereof for urging said guiding element to said raised operative position and for permitting said guiding element to move to said depressed inoperative position when said second sensing element is moved to said outer position thereof; means engageable with said guiding element for blocking movement of the latter to said depressed inoperative position; and means responsive to movement of said first sensing element from said inner position to said outer position thereof for disengaging from said guiding element said means for blocking movement of the latter to said depressed inoperative position so that said guiding element is thereby permitted to move to said depressed inoperative position only when a large-sized cassette, in being inserted through said inlet into said cassette-receiving space, simultaneously displaces said first and second sensing elements to said outer positions thereof.

2. A cassette housing shelf according to claim 1; further comprising a steering member disposed between said inlet and said guiding element and being movable between a raised operative position at least partly above said cassette-bearing surface and a depressed inoperative position submerged relative to said cassette-bearing surface, means for yieldably urging said steering member to said operative position thereof, said steering member having an upper surface with an end portion inclined downwardly toward said inlet so that, when a large-sized cassette is inserted through said inlet into said cassette-receiving space, said large-sized cassette slidably engages said inclined end portion of the upper surface for deflecting said steering member to said depressed inoperative position, and said steering member further having a side surface facing toward said one side wall and formed with an end portion angled away from said one side wall in the direction toward said inlet so that, when a small-sized cassette is inserted through said inlet into said cassette-receiving space, said side surface steers the small-sized cassette into a part of said cassette-receiving space between said guiding element and said one side wall.

3. A cassette housing shelf according to claim 1; in which an outlet is defined above said cassette-bearing surface at the opposite end of said shelf plate and through which a cassette may be withdrawn from, and returned to said cassette-receiving space; and further comprising a third sensing element disposed adjacent said outlet at said other side wall and being movable between an inner position where said third sensing element projects beyond said other side wall at least partly into said cassette-receiving space and an outer position withdrawn from said space; means responsive to movement of said third sensing element to said outer position thereof for permitting said guiding element to move to said depressed inoperative position; and locking means operative upon the insertion of a large-sized cassette in said cassette-receiving space for thereafter maintaining disengagement of said guiding element from said means for blocking movement of the latter to said depressed inoperative position so that, when returning a large-sized cassette through said outlet into said cassette-receiving space, the engagement of the returning cassette with said third sensing element results in movement of the guiding element to its depressed inoperative position.

4. A cassette housing shelf according to claim 3; further comprising means for ejecting a cassette from said cassette-receiving space through said inlet; and means for releasing said locking means upon operation of said means for ejecting.

* * * * *